G. G. HUNT.
Barbed-Fence Wire.
No. 197,729. Patented Dec. 4, 1877.
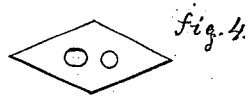
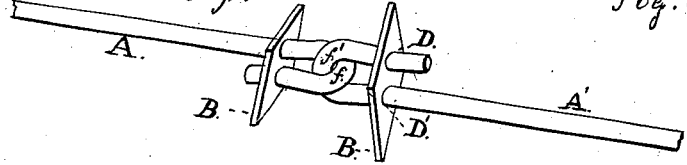
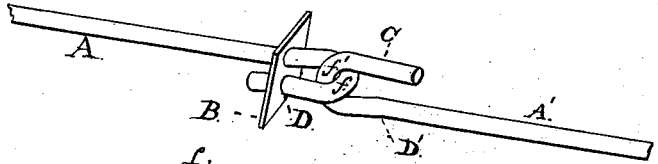
Witnesses,
T. S. Hunt
Stephen Buxton
Inventor
George G. Hunt

UNITED STATES PATENT OFFICE.

GEORGE G. HUNT, OF BRISTOL, ILLINOIS.

IMPROVEMENT IN BARBED FENCE-WIRE.

Specification forming part of Letters Patent No. 197,729, dated December 4, 1877; application filed January 24, 1877.

*To all whom it may concern:*

Be it known that I, GEORGE G. HUNT, of Bristol, Illinois, have invented a new and useful Improvement in Metallic Fences, of which the following is a specification.

The nature of this invention relates to an improvement in metal rods for fences, which improvement consists, generally, in their construction, and more particularly in the mode of fastening barbs or spurs thereon. The metal rods aforesaid may be of any suitable size for the purpose designed—from one-tenth of an inch in diameter, or thereabout, up to one-half an inch or longer.

In the drawing, accompanying and forming a part of this specification, Figure 1 is a perspective view of a portion of two sections of the metal rods, showing the mode of construction and the method of connecting them together; also, showing the barbs or spurs in position after being fastened upon the bent ends of the rods forming the body of the fence. Fig. 2 is a similar view of the invention, but with a barb left off on one end of each section, as a modification of the improvement. Fig. 3 shows the flat surface of the barb or spur used.

In making this fence the rods of metal (of any suitable size desired) are cut into short lengths, and bent, at each end, into short loops $f\ f'$, Fig. 1, and bent in such a manner that the short ends of the loops may lie about parallel with the main part of the rod, as shown at C, Fig. 2. The length of the rods is such that the barbs may be the distance apart desired—say, from five to ten inches apart—on rods seven to twelve inches long.

The barb B is cut from sheet steel, as the most suitable material, the steel being rolled in narrow strips of about one-twentieth of an inch in thickness, or any other thickness desired, and cut diagonally across, forming diamond-shaped pieces. These pieces have holes D D', Fig. 1, through one of which the rod A passes, and through the other the short end of the loop, as shown in the figure. The holes in the barb B are made a little nearer to each other from center to center than is the distance apart of the parts of the rod forming the loop from center to center, for the reason that the barb may wedge a little when forced on the loop, and thereby assist in holding it firmly. After the barb is put on in its proper position, the short end of the loop which projects beyond the barb may be bent outward in the manner shown in Fig. 1, or the end of the rod may be riveted or flattened, to prevent the barb from slipping off.

For the purpose of forming a fence which may be easily taken apart, the sections may have a barb on one end only, and an open loop or hook on the other, to hook together, as shown in Fig. 2.

In my application of January 8, 1877, the barb is described as being held in position in and by the embrace of the loops of two contiguous sections: whereas, in this, my present application and description, the barb is held in position and fastened rigidly on each section to which it naturally belongs, and, by being so fastened, the strength of the fence is greatly increased, being, in fact, stronger where joined than in any other part.

Having thus described my invention, what I claim as new, and desire to secure by Letters Patent, is—

The combination of the bent sections A and A' when such sections are provided with one or more barbs B, in the manner as and for the purpose specified.

GEORGE G. HUNT.

Witnesses:
  STEPHEN BUXTON,
  T. S. HUNT.